US012584724B2

(12) United States Patent
Ueda et al.

(10) Patent No.: US 12,584,724 B2
(45) Date of Patent: Mar. 24, 2026

(54) CLEARANCE SENSOR

(71) Applicant: MITSUBISHI HEAVY INDUSTRIES, LTD., Tokyo (JP)

(72) Inventors: Motoharu Ueda, Tokyo (JP); Tomoyuki Onishi, Tokyo (JP); Toshiaki Kokufuda, Tokyo (JP); Hiroki Takeda, Tokyo (JP); Takuma Ikemoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 216 days.

(21) Appl. No.: 18/232,500

(22) Filed: Aug. 10, 2023

(65) Prior Publication Data

US 2023/0384081 A1 Nov. 30, 2023

Related U.S. Application Data

(63) Continuation of application No. PCT/JP2022/007666, filed on Feb. 24, 2022.

(30) Foreign Application Priority Data

Mar. 11, 2021 (JP) ................................. 2021-039173

(51) Int. Cl.
*G01B 7/14* (2006.01)
(52) U.S. Cl.
CPC ...................................... *G01B 7/14* (2013.01)
(58) Field of Classification Search
CPC ................................................. G01B 7/00–34
See application file for complete search history.

(56) References Cited

U.S. PATENT DOCUMENTS 4,568,873 A 2/1986 Oyanagi et al.
4,804,905 A 2/1989 Ding et al.
(Continued)

FOREIGN PATENT DOCUMENTS

CN 111043949 A * 4/2020 .............. G01B 7/14
JP 53-12661 10/1978
(Continued)

OTHER PUBLICATIONS

Machine Translation of CN-111043949-A (Year: 2020).*
(Continued)

*Primary Examiner* — Lee E Rodak
*Assistant Examiner* — Jeremiah J Barron
(74) *Attorney, Agent, or Firm* — Wenderoth, Lind & Ponack, L.L.P.

(57) ABSTRACT

A clearance sensor includes: a columnar detection electrode having a detection end surface on one end side in the axial direction of the center axis; an electrode member including a guard electrode and a ground electrode having the center axis coaxial with that of the detection electrode; an insulating member linking between the detection electrode and the guard electrode, and linking between the guard electrode and the ground electrode; and an insulating layer filling the spaces between the detection electrode, the guard electrode, the ground electrode, and the insulating member, wherein the space between the electrode member and the insulating member is retained in the axial direction and/or the direction around the axis of the center axis.

12 Claims, 9 Drawing Sheets

(56)         References Cited

U.S. PATENT DOCUMENTS

| | | | |
|---|---|---|---|
| 2014/0119884 A1 | 5/2014 | Esler et al. | |
| 2016/0141154 A1* | 5/2016 | Kamata ............. | H01J 37/32935 |
| | | | 324/671 |
| 2017/0077679 A1 | 3/2017 | Deguchi et al. | |
| 2020/0095998 A1 | 3/2020 | Kabasawa | |

FOREIGN PATENT DOCUMENTS

| | | |
|---|---|---|
| JP | 55-99004 | 7/1980 |
| JP | 58-144215 | 9/1983 |
| JP | 61-6706 | 1/1986 |
| JP | 63-73603 | 5/1988 |
| JP | 4-297805 | 10/1992 |
| JP | 8-29111 | 2/1996 |
| JP | 2004-354269 | 12/2004 |
| JP | 2017-59364 | 3/2017 |
| JP | 2018-159632 | 10/2018 |
| JP | 6431665 | 11/2018 |

OTHER PUBLICATIONS

International Search Report issued Apr. 5, 2022 in corresponding International (PCT) Application No. PCT/JP2022/007666.
International Written Opinion issued Apr. 5, 2022 in corresponding International (PCT) Application No. PCT/JP2022/007666, with English translation.
Office Action issued Oct. 8, 2024 in Japanese Patent Application No. 2021-039173, with English-language Translation.
Partial Supplementary European Search Report issued Jan. 29, 2024 in corresponding European Patent Application No. 22766846.4.

\* cited by examiner

CLEARANCE SENSOR

CROSS-REFERENCE TO RELATED APPLICATION

This application is a continuation of PCT international application No. PCT/JP2022/007666 filed on Feb. 24, 2022 which claims the benefit of priority from Japanese patent application No. 2021-039173 filed on Mar. 11, 2021, the entire contents of which are incorporated herein by reference.

TECHNICAL FIELD

The present disclosure relates to a clearance sensor.

BACKGROUND ART

A rotary machine such as an axial compressor including a plurality of rotor blades rotating inside a casing formed in a cylindrical shape is known. In such a type of rotary machine, a tip clearance sensor that measures a tip clearance between the casing and the rotor blade is provided, and the value of the measured tip clearance is maintained to be appropriate. As such a tip clearance sensor, for example, a non-contact type sensor such as a capacitance type sensor is used (see, for example, Japanese Patent No. 6431665).

The clearance sensor described in Japanese Patent No. 6431665 has a three-layer structure including a detection electrode, a guard electrode, and a ground electrode of which the central axes are coaxial with each other and insulation layers are disposed between the electrodes. In the case of such a clearance sensor, for example, the insulation layers are attached by means of thermal spraying or the like, and assembly of each electrode is performed along with fit adjustment. As a result, a variation in assembly accuracy becomes great and there may be a decrease in reliability, for example, in a case where the tip clearance is to be measured for a long period of time as described above.

The present disclosure has been made in view of such circumstances and an object thereof is to provide a clearance sensor with which it is possible to suppress a decrease in long-term measurement reliability.

SUMMARY OF THE INVENTION

According to an aspect of the present disclosure, there is provided a clearance sensor including an electrode member that includes a columnar detection electrode including a detection end surface on one end side in an axial direction along a central axis and that includes a guard electrode and a ground electrode of which central axes are coaxial with the central axis of the detection electrode, an insulation member that connects the detection electrode and the guard electrode to each other and that connects the guard electrode and the ground electrode to each other, and an insulation layer that fills a gap between the detection electrode, the guard electrode, the ground electrode, and the insulation member. The electrode member and the insulation member are locked to each other in at least one of the axial direction along the central axis and a direction around the central axis.

According to another aspect of the present disclosure, there is provided a clearance sensor including an electrode member that includes a columnar detection electrode including a detection end surface on one end side in an axial direction along a central axis and that includes a guard electrode and a ground electrode of which central axes are coaxial with the central axis of the detection electrode, an insulation member that connects the detection electrode and the guard electrode to each other and that connects the guard electrode and the ground electrode to each other, an insulation layer that fills a gap between the detection electrode, the guard electrode, the ground electrode, and the insulation member, and a cooling flow path that penetrates the electrode member and the insulation member in the axial direction along the central axis.

According to the aspects of the present disclosure, it is possible to provide a clearance sensor with which it is possible to suppress a decrease in long-term measurement reliability.

DETAILED DESCRIPTION OF THE INVENTION

Hereinafter, an embodiment of a clearance sensor according to the present disclosure will be described with reference to the drawings. Incidentally, the disclosure is not limited by the embodiment. In addition, components in the following embodiment include components that can be easily replaced by those skilled in the art, or components that are substantially the same.

Figure 1:
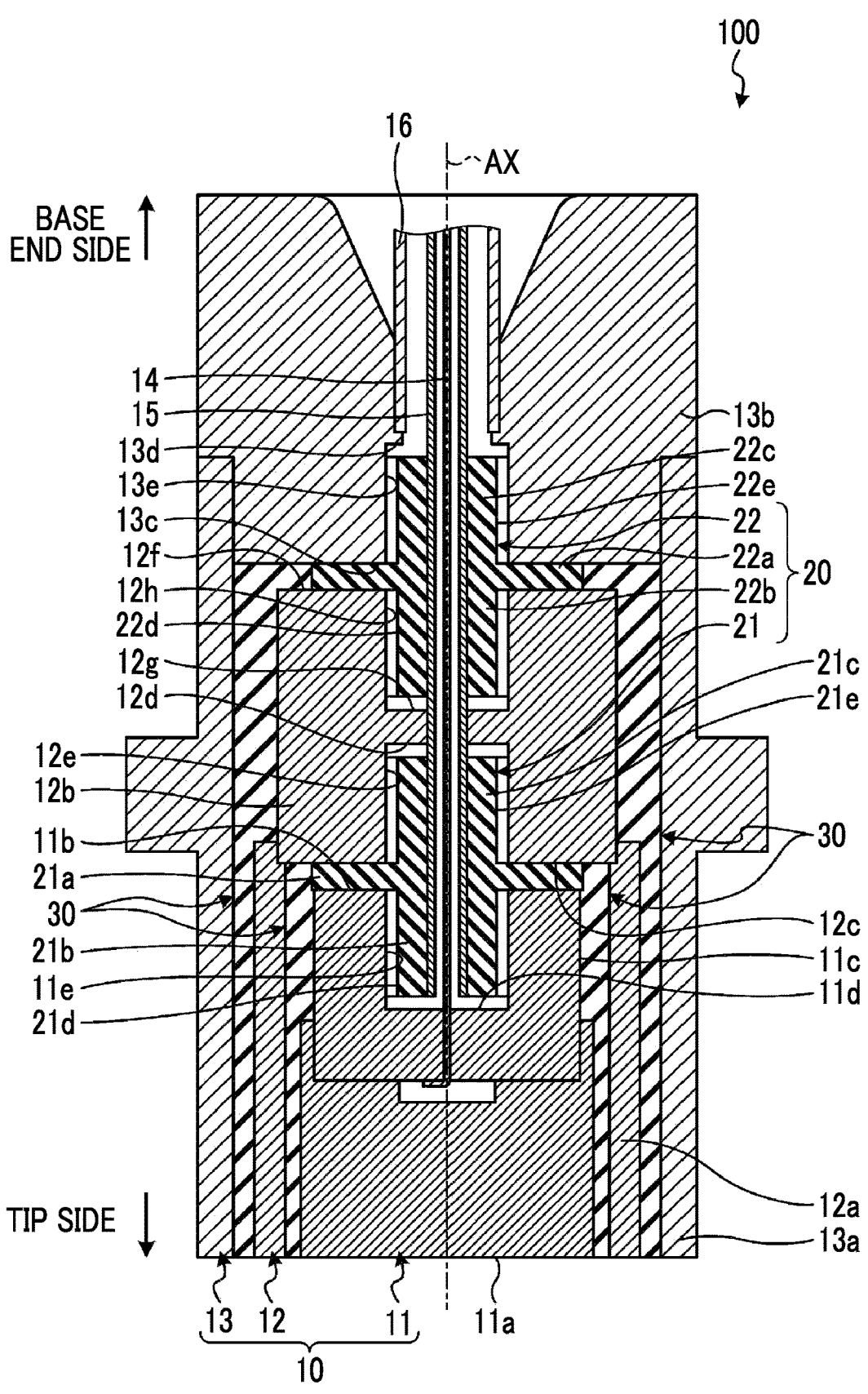
FIG. 1 is a view showing an example of a clearance sensor according to the present embodiment.

FIG. 1 is a view showing an example of a clearance sensor 100 according to the present embodiment. FIG. 1 shows an example of a cross-sectional configuration cut along a plane passing through a central axis AX. The clearance sensor 100 shown in FIG. 1 is a capacitance sensor. The clearance sensor 100 can be used, for example, in the case of measurement or the like of a tip clearance between a casing and a plurality of rotor blades of an axial compressor that includes the rotor blades rotating inside the casing formed in a cylindrical shape as in the case of a gas turbine or the like. The clearance sensor 100 includes electrode members 10, insulation members 20, and insulation layers 30.

The electrode members 10 include a detection electrode 11, a guard electrode 12, and a ground electrode 13. The electrode members 10 are formed of, for example, metal or alloy such as stainless steel. The central axes AX of the detection electrode 11, the guard electrode 12, and the ground electrode 13 are coaxial with each other and the detection electrode 11, the guard electrode 12, and the ground electrode 13 are provided to form three layers arranged in a radial direction.

The detection electrode 11 is a columnar electrode centered on the central axis AX. The detection electrode 11 includes a detection end surface 11*a* at one end in an axial direction along the central axis AX. Hereinafter, the detection end surface 11*a* side in the axial direction along the central axis AX may be referred to as a tip side and a side opposite to the detection end surface 11*a* side may be referred to as a base end side in a case where the positional relationship of the clearance sensor 100 is to be described. The clearance sensor 100 measures a tip clearance in a state where the detection end surface 11*a* is disposed at a corresponding position on an inner peripheral surface of a casing.

The detection electrode 11 is connected to, for example, an inorganic insulation (MI) cable. The MI cable includes a wire portion 14, a tubular member 15, and a tubular component 16. The wire portion 14, the tubular member 15, and the tubular component 16 of the MI cable form a three-layer structure, and insulators such as magnesium oxide fill gaps between the components. The wire portion 14 is bonded to the detection electrode 11 through welding or the like. The wire portion 14 is disposed to extend from the detection electrode 11 to the other end side in the axial direction along the central axis AX. The wire portion 14 is connected to a processing device (not shown) or the like. The wire portion 14 can be disposed on, for example, the central axis AX. The tubular member 15 is bonded to a guard base portion 12*b*, which will be described later, through welding or the like. The tubular component 16 is bonded to a ground base portion 13*b*, which will be described later, through welding or the like.

The detection electrode 11 includes a recess portion 11*d* at an end surface 11*b* on the base end side. The recess portion 11*d* has a shape obtained by hollowing out the end surface 11*b* in a columnar shape extending toward the tip side. The inner peripheral surface of the recess portion 11*d* is a cylindrical surface. A screw thread 11*e* is formed on the inner peripheral surface of the recess portion 11*d*. The screw thread 11*e* is spirally formed on the inner peripheral surface of the recess portion 11*d* from the base end side to the tip side.

The guard electrode 12 includes a guard cylindrical portion 12*a* that is centered on the central axis AX and that has a cylindrical shape and the guard base portion 12*b* that is centered on the central axis AX and that has a columnar shape. The central axis of the guard electrode 12 is coaxial with the central axis of the detection electrode 11.

The guard cylindrical portion 12*a* surrounds an outer peripheral surface 11*c* of the detection electrode 11. The guard cylindrical portion 12*a* is disposed with a predetermined gap provided between the guard cylindrical portion 12*a* and the outer peripheral surface 11*c* of the detection electrode 11. A tip side end surface of the guard cylindrical portion 12*a* is flush with the detection end surface 11*a* of the detection electrode 11.

The guard base portion 12*b* is disposed on the other end side in the axial direction along the central axis AX with respect to the detection electrode 11. The guard base portion 12*b* is connected to the guard cylindrical portion 12*a* through, for example, welding or the like.

The guard base portion 12*b* includes a recess portion 12*d* at an end surface 12*c* on the tip side. The recess portion 12*d* has a shape obtained by hollowing out the end surface 12*c* in a columnar shape extending toward the base end side. The inner peripheral surface of the recess portion 12*d* is a cylindrical surface. A screw thread 12*e* is formed on the inner peripheral surface of the recess portion 12*d*. The screw thread 12*e* is spirally formed on the inner peripheral surface of the recess portion 12*d* from the tip side to the base end side.

The guard base portion 12*b* includes a recess portion 12*g* at an end surface 12*f* on the base end side. The recess portion 12*g* has a shape obtained by hollowing out the end surface 12*f* in a columnar shape extending toward the base end side. The inner peripheral surface of the recess portion 12*g* is a cylindrical surface. A screw thread 12*h* is formed on the inner peripheral surface of the recess portion 12*g*. The screw thread 12*h* is spirally formed on the inner peripheral surface of the recess portion 12*g* from the tip side to the base end side.

The ground electrode 13 includes a ground cylindrical portion 13*a* that is centered on the central axis AX and that has a cylindrical shape and the ground base portion 13*b* that is centered on the central axis AX and that has a columnar shape. The central axis of the ground electrode 13 is coaxial with the central axes of the detection electrode 11 and the guard electrode 12.

The ground cylindrical portion 13*a* surrounds an outer peripheral surface of the guard electrode 12. The ground cylindrical portion 13*a* is disposed with a predetermined gap provided between the ground cylindrical portion 13*a* and the outer peripheral surface of the guard electrode 12. A tip side end surface of the ground cylindrical portion 13*a* is flush with the detection end surface 11*a* of the detection electrode 11 and a tip side end surface of the guard cylindrical portion 12*a*.

The ground base portion 13*b* is disposed on the other end side in the axial direction along the central axis AX with respect to the guard electrode 12. The ground base portion 13*b* is connected to the ground cylindrical portion 13*a* through, for example, welding or the like.

The ground base portion 13*b* includes a recess portion 13*d* at an end surface 13*c* on the tip side. The recess portion 13*d* has a shape obtained by hollowing out the end surface 13*c* in a columnar shape extending toward the base end side. The inner peripheral surface of the recess portion 13*d* is a cylindrical surface. A screw thread 13*e* is formed on the inner peripheral surface of the recess portion 13*d*. The screw thread 13*e* is spirally formed on the inner peripheral surface of the recess portion 13*d* from the tip side to the base end side.

The insulation members 20 connect the detection electrode 11 and the guard electrode 12 to each other and connect the guard electrode 12 and the ground electrode 13 to each other. The insulation members 20 include a first insulation member 21 and a second insulation member 22. The first insulation member 21 and the second insulation member 22 are formed of insulators such as ceramics.

The first insulation member 21 is disposed between the detection electrode 11 and the guard base portion 12*b* in the axial direction along the central axis AX. The first insulation member 21 connects the detection electrode 11 and the guard base portion 12*b* to each other in the axial direction.

The first insulation member 21 has a base portion 21*a* and protrusion portions 21*b* and 21*c*. The base portion 21*a* has a columnar shape centered on the central axis AX. The protrusion portion 21*b* protrudes from the base portion 21*a* toward the tip side. The protrusion portion 21*c* protrudes from the base portion 21*a* to the base end side. Each of the protrusion portions 21*b* and 21*c* has a columnar shape centered on the central axis AX and has a diameter smaller than that of the base portion 21*a*, for example. The diameter of the protrusion portion 21*b* is set such that the protrusion portion 21*b* can be inserted into the recess portion 11*d* of the detection electrode 11 described above. An outer peripheral surface of the protrusion portion 21*b* is a cylindrical surface. A screw thread 21*d* is formed on the outer peripheral surface of the protrusion portion 21*b*. The screw thread 21*d* is spirally formed on the outer peripheral surface of the protrusion portion 21*b* from the base end side to the tip side such that the screw thread 21*d* is screw-bonded to the screw thread 11*e* of the recess portion 11*d* of the detection electrode 11 described above. The protrusion portion 21*b* is inserted into the recess portion 11*d* of the detection electrode 11 in a state where the screw thread 21*d* and the screw thread 11*e* are screw-bonded to each other. In this manner, the first insulation member 21 is screw-bonded to the detection electrode 11.

Meanwhile, the diameter of the protrusion portion 21*c* is set such that the protrusion portion 21*c* can be inserted into the recess portion 12*d* of the guard electrode 12 described above. An outer peripheral surface of the protrusion portion 21*c* is a cylindrical surface. A screw thread 21*e* is formed on the outer peripheral surface of the protrusion portion 21*c*. The screw thread 21*e* is spirally formed on the outer peripheral surface of the protrusion portion 21*c* from the base end side to the tip side such that the screw thread 21*e* is screw-bonded to the screw thread 12*e* of the recess portion 12*d* of the guard electrode 12 described above. The protrusion portion 21*c* is inserted into the recess portion 12*d* of the guard electrode 12 in a state where the screw thread 21*e* and the screw thread 12*e* are screw-bonded to each other. In this manner, the first insulation member 21 is screw-bonded to the guard electrode 12.

The second insulation member 22 is disposed between the guard base portion 12*b* and the ground base portion 13*b* in the axial direction along the central axis AX. The second insulation member 22 connects the guard base portion 12*b* and the ground base portion 13*b* to each other in the axial direction.

The second insulation member 22 has a base portion 22*a* and protrusion portions 22*b* and 22*c*. The base portion 22*a* has a columnar shape centered on the central axis AX. The protrusion portion 22*b* protrudes from the base portion 22*a* toward the tip side. The protrusion portion 22*c* protrudes from the base portion 22*a* to the base end side. Each of the protrusion portions 22*b* and 22*c* has a columnar shape centered on the central axis AX and has a diameter smaller than that of the base portion 22*a*, for example. The diameter of the protrusion portion 22*b* is set such that the protrusion portion 22*b* can be inserted into the recess portion 12*g* of the guard electrode 12 described above. An outer peripheral surface of the protrusion portion 22*b* is a cylindrical surface. A screw thread 22*d* is formed on the outer peripheral surface of the protrusion portion 22*b*. The screw thread 22*d* is spirally formed on the outer peripheral surface of the protrusion portion 22*b* from the base end side to the tip side such that the screw thread 22*d* is screw-bonded to the screw thread 12*h* of the recess portion 12*g* of the guard electrode 12 described above. The protrusion portion 22*b* is inserted into the recess portion 12*g* of the guard electrode 12 in a state where the screw thread 22*d* and the screw thread 12*h* are screw-bonded to each other. In this manner, the second insulation member 22 is screw-bonded to the guard electrode 12.

Meanwhile, the diameter of the protrusion portion 22*c* is set such that the protrusion portion 22*c* can be inserted into the recess portion 13*d* of the ground electrode 13 described above. An outer peripheral surface of the protrusion portion 22*c* is a cylindrical surface. A screw thread 22*e* is formed on the outer peripheral surface of the protrusion portion 22*c*.

The screw thread 22*e* is spirally formed on the outer peripheral surface of the protrusion portion 22*c* from the base end side to the tip side such that the screw thread 22*e* is screw-bonded to the screw thread 13*e* of the recess portion 13*d* of the ground electrode 13 described above. The protrusion portion 22*c* is inserted into the recess portion 13*d* of the ground electrode 13 in a state where the screw thread 22*e* and the screw thread 13*e* are screw-bonded to each other. In this way, the second insulation member 22 is screw-bonded to the ground electrode 13.

As described above, the electrode members 10 and the insulation members 20 are locked to each other in at least one of the axial direction along the central axis AX and a direction around the central axis AX with the recess portion 11*d* of the detection electrode 11 being screw-bonded to the protrusion portion 21*b* of the first insulation member 21, the protrusion portion 21*c* of the first insulation member 21 being screw-bonded to the recess portion 12*d* of the guard electrode 12, the recess portion 12*g* of the guard electrode 12 being screw-bonded to the protrusion portion 22*b* of the second insulation member 22, and the protrusion portion 22*c* of the second insulation member 22 being screw-bonded to the recess portion 13*d* of the ground electrode 13.

For the insulation layers 30, for example, a ceramic-based insulating adhesive agent or the like is used. The insulation layers 30 fill gaps between the detection electrode 11, the guard electrode 12, the ground electrode 13, and the insulation members 20 (the first insulation member 21 and the second insulation member 22). Since the insulation layers 30 are disposed, it is possible to insulate the detection electrode 11, the guard electrode 12, and the ground electrode 13 from each other and to suppress relative rotational movement in the direction around the central axis AX. In addition, the insulation layers 30 are disposed to fill a gap between screw parts or the like between the first insulation member 21 and the detection electrode 11, between the first insulation member 21 and the guard electrode 12, between the second insulation member 22 and the guard electrode 12, and between the second insulation member 22 and the ground electrode 13. Accordingly, relative rotational movement of each component can be suppressed.

As described above, the clearance sensor 100 according to the present embodiment includes the electrode members 10 that include the columnar detection electrode 11 including the detection end surface on one end side in the axial direction along the central axis AX and that include the guard electrode 12 and the ground electrode 13 of which the central axes AX are coaxial with the central axis AX of the detection electrode 11, the insulation members 20 that connect the detection electrode 11 and the guard electrode 12 to each other and that connect the guard electrode 12 and the ground electrode 13 to each other, and the insulation layers 30 that fill gaps between the detection electrode 11, the guard electrode 12, the ground electrode 13, and the insulation members 20. The electrode members and the insulation members 20 are locked to each other in at least one of the axial direction along the central axis AX and the direction around the central axis AX.

In this configuration, the electrode members 10 and the insulation members 20 are locked to each other so that positional deviation between the electrode members 10 and the insulation members 20 can be suppressed. Therefore, it is possible to suppress a decrease in long-term measurement reliability. In addition, in a case where long-term measurement is performed at a high temperature as in a case where a tip clearance between a casing of a gas turbine and a rotor blade is measured, wear of the insulation members and delamination of the insulation layers 30 caused by a thermal elongation difference and vibrations can be suppressed and thus reliability can be maintained for a long period of time.

In addition, in the clearance sensor 100 according to the present embodiment, the guard electrode 12 includes the guard cylindrical portion 12a that surrounds the outer peripheral surface of the detection electrode 11 and the guard base portion 12b that is disposed on the base end side in the axial direction with respect to the detection electrode 11 and that is connected to the guard cylindrical portion 12a, the ground electrode 13 includes the ground cylindrical portion 13a that surrounds the outer peripheral surface of the guard electrode 12 and the ground base portion 13b that is disposed on the base end side with respect to the guard electrode 12 and that is connected to the ground cylindrical portion 13a, and the insulation members 20 include the first insulation member 21 that connects the detection electrode 11 and the guard base portion 12b to each other in the axial direction and the second insulation member 22 that connects the guard base portion 12b and the ground base portion 13b to each other in the axial direction. Therefore, since the base portions of the respective electrodes constituting the electrode members 10 are connected to each other by the insulation members 20 and connection portions are locked, positional deviation between the electrode members 10 and the insulation members 20 can be more reliably suppressed.

In addition, in the clearance sensor 100 according to the present embodiment, the electrode members 10 and the insulation members 20 are locked to each other by being screw-bonded to each other. Therefore, the positional deviation between the electrode members 10 and the insulation members 20 can be suppressed in both of the axial direction along the central axis AX and the direction around the central axis AX.

In the above-described example shown in FIG. 1, a configuration in which the electrode members 10 and the insulation members 20 are locked to each other by being screw-bonded to each other has been described as an example. However, a configuration in which the electrode members 10 and the insulation members 20 are locked to each other is not limited to a configuration in which the electrode members 10 and the insulation members 20 are locked to each other by being screw-bonded to each other.

Figure 2:
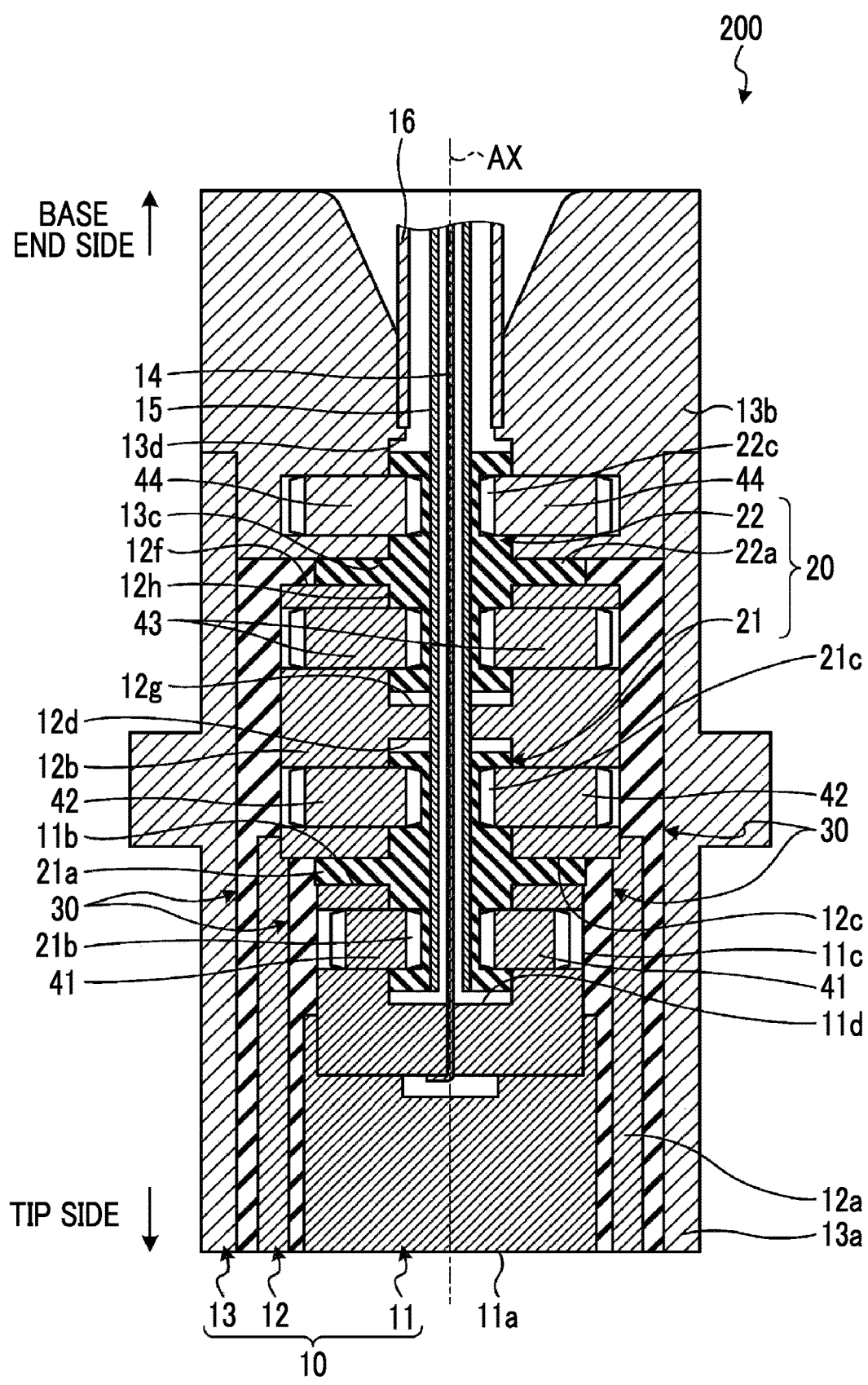
FIG. 2 is a view showing another example of the clearance sensor according to the present embodiment.

FIG. 2 is a view showing another example of the clearance sensor according to the present embodiment. FIG. 2 shows an example of a cross-sectional configuration cut along a plane passing through the central axis AX. For example, as in the case of a clearance sensor 200 in FIG. 2, a configuration in which the electrode members 10 and the insulation members 20 are locked to each other with pins inserted between the electrode members 10 and the insulation members 20 may also be adopted.

In an example shown in FIG. 2, pins 41 are disposed between the detection electrode 11 and the first insulation member 21. The pins 41 penetrate between the outer peripheral surface of the detection electrode 11 and the recess portion 11d and are disposed so as to be inserted into an outer periphery of the protrusion portion 21b of the first insulation member 21. Since the pins 41 are disposed, relative movement of the detection electrode 11 and the first insulation member 21 in the axial direction along the central axis AX and the direction around the central axis AX is restricted.

In addition, pins 42 are disposed between the guard electrode 12 and the first insulation member 21. The pins 42 penetrate between the outer peripheral surface of the guard electrode 12 and the recess portion 12d and are disposed so as to be inserted into an outer periphery of the protrusion portion 21c of the first insulation member 21. Since the pins 42 are disposed, relative movement of the guard electrode 12 and the first insulation member 21 in the axial direction along the central axis AX and the direction around the central axis AX is restricted.

In addition, pins 43 are disposed between the guard electrode 12 and the second insulation member 22. The pins 43 penetrate between the outer peripheral surface of the guard electrode 12 and the recess portion 12g and are disposed so as to be inserted into an outer periphery of the protrusion portion 22b of the second insulation member 22. Since the pins 43 are disposed, relative movement of the guard electrode 12 and the second insulation member 22 in the axial direction along the central axis AX and the direction around the central axis AX is restricted.

In addition, pins 44 are disposed between the ground electrode 13 and the second insulation member 22. The pins 44 penetrate between the outer peripheral surface of the ground electrode 13 and the recess portion 13d and are disposed so as to be inserted into an outer periphery of the protrusion portion 22c of the second insulation member 22. Since the pins 44 are disposed, relative movement of the ground electrode 13 and the second insulation member 22 in the axial direction along the central axis AX and the direction around the central axis AX is restricted.

A plurality of the pins 41, 42, 43, and 44 are disposed, for example, in the direction around the central axis AX. The pins 41, 42, 43, and 44 are formed of, for example, metal or an alloy as with the electrode members 10. Note that, the pins 41, 42, 43, and 44 may be formed by using an insulator such as ceramics as with the insulation members 20.

As described above, in the clearance sensor 200 according to the present embodiment, the electrode members 10 and the insulation members 20 are locked to each other by means of insertion of the pins 41, 42, 43, and 44. Therefore, the positional deviation between the electrode members 10 and the insulation members 20 can be suppressed in both of the axial direction along the central axis AX and the direction around the central axis AX.

Figure 3:
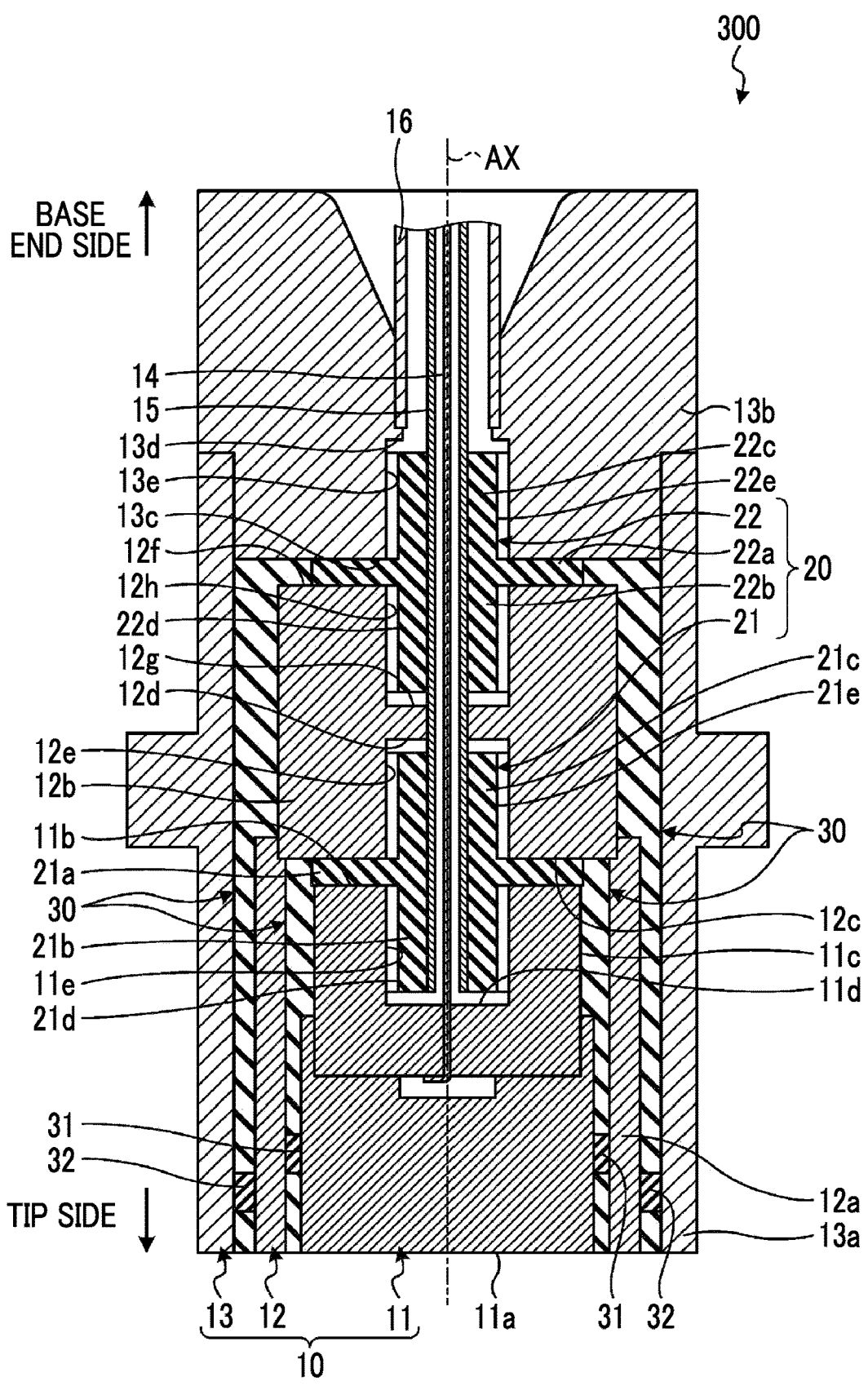
FIG. 3 is a view showing another example of the clearance sensor according to the present embodiment.

FIG. 3 is a view showing another example of the clearance sensor according to the present embodiment. The clearance sensor 300 shown in FIG. 3 has a configuration in which spacer members formed of an insulator such as alumina are disposed between the detection electrode 11 and the guard electrode 12 and between the guard electrode 12 and the ground electrode 13. Other configurations are the same as the above-described configurations (configurations shown in FIG. 1).

As shown in FIG. 3, a spacer member 31 is disposed between the detection electrode 11 and the guard cylindrical portion 12a of the guard electrode 12. The spacer member 31 has, for example, a ring-like shape. However, the shape thereof is not limited thereto and another shape may also be adopted. Since the spacer member 31 is disposed, positional deviation between the detection electrode 11 and the guard cylindrical portion 12a is suppressed. In a configuration shown in FIG. 3, recess portions for accommodation of the spacer member 31 may be provided at an outer periphery of the detection electrode 11 and an inner periphery of the guard cylindrical portion 12a, respectively. In addition, a configuration in which each of the detection electrode 11 and the guard cylindrical portion 12a includes a tapered diameter reduction portion of which the diameter decreases toward the tip side and the spacer member 31 is disposed between the diameter reduction portion of the detection electrode 11 and the diameter reduction portion of the guard cylindrical portion 12*a* may also be adopted. Accordingly, positional deviation of the spacer member 31 is suppressed.

A spacer member 32 is disposed between the guard cylindrical portion 12*a* of the guard electrode 12 and the ground cylindrical portion 13*a* of the ground electrode 13. The spacer member 32 has, for example, a ring-like shape. However, the shape thereof is not limited thereto and another shape may also be adopted. Since the spacer member 32 is disposed, positional deviation between the guard cylindrical portion 12*a* and the ground cylindrical portion 13*a* is suppressed. In a configuration shown in FIG. 3, recess portions for accommodation of the spacer member 32 may be provided at an outer periphery of the guard cylindrical portion 12*a* and an inner periphery of the ground cylindrical portion 13*a*, respectively. In addition, a configuration in which each of the guard cylindrical portion 12*a* and the ground cylindrical portion 13*a* includes a tapered diameter reduction portion of which the diameter decreases toward the tip side and the spacer member 32 is disposed between the diameter reduction portion of the guard cylindrical portion 12*a* and the diameter reduction portion of the ground cylindrical portion 13*a* may also be adopted. Accordingly, positional deviation of the spacer member 32 is suppressed.

As described above, in the clearance sensor 300 according to the present embodiment, the spacer members 31 and 32 are disposed between the detection electrode 11 and the guard electrode 12 and between the guard electrode 12 and the ground electrode 13, so that positional deviation between the detection electrode 11 and the guard cylindrical portion 12*a* of the guard electrode 12 and positional deviation between the guard cylindrical portion 12*a* of the guard electrode 12 and the ground cylindrical portion 13*a* of the ground electrode 13 can be suppressed.

Figure 4:
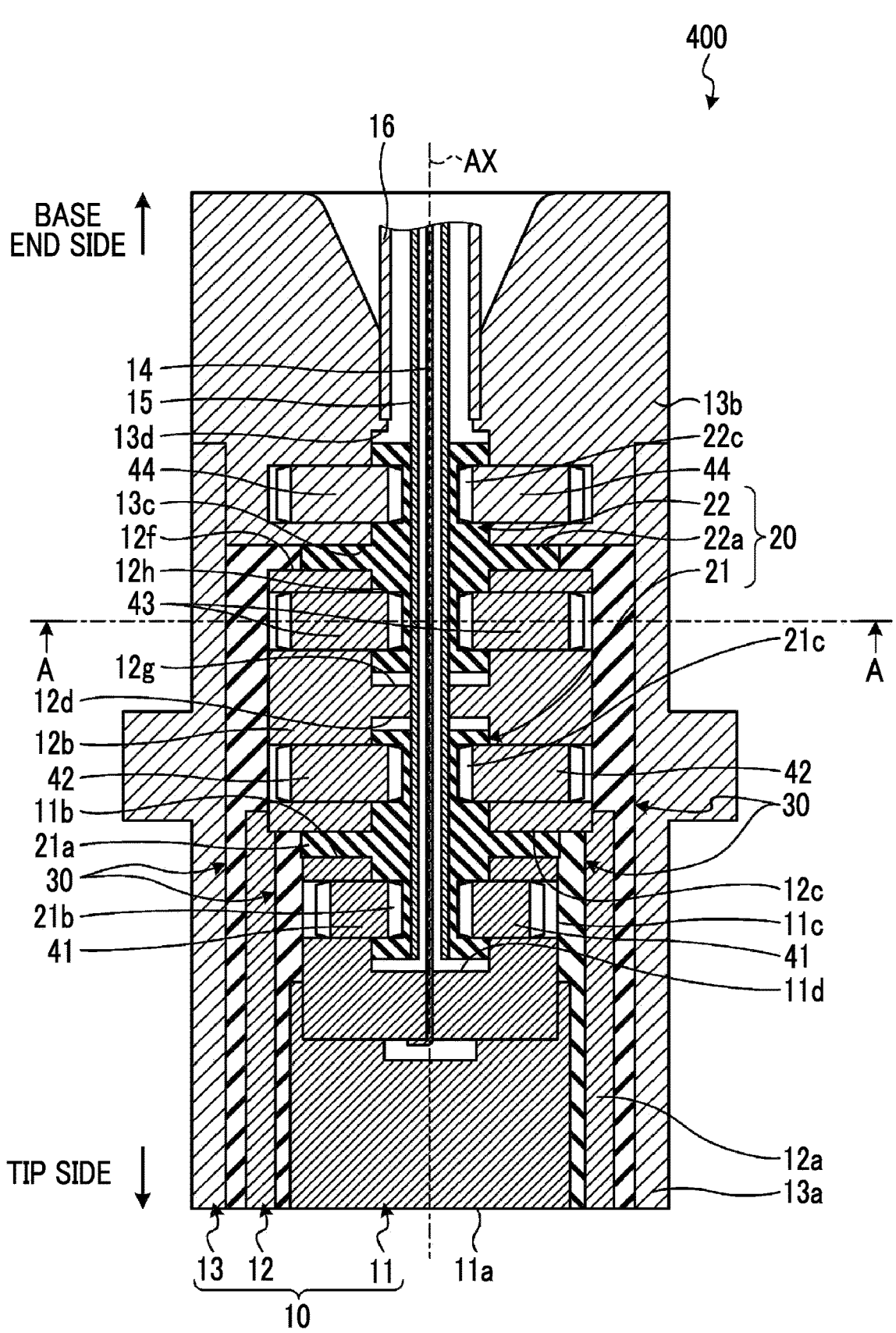
FIG. 4 is a view showing another example of the clearance sensor according to the present embodiment.
Figure 5:
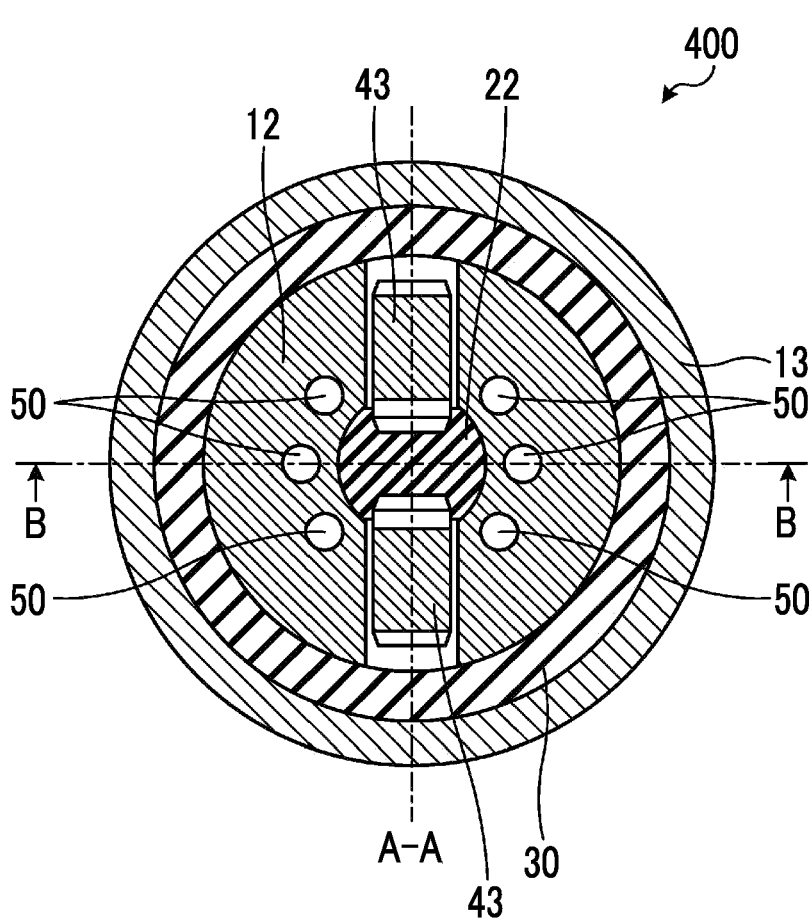
FIG. 5 is a view showing a configuration as seen in a cross section taken along line A-A in FIG. 4.
Figure 6:
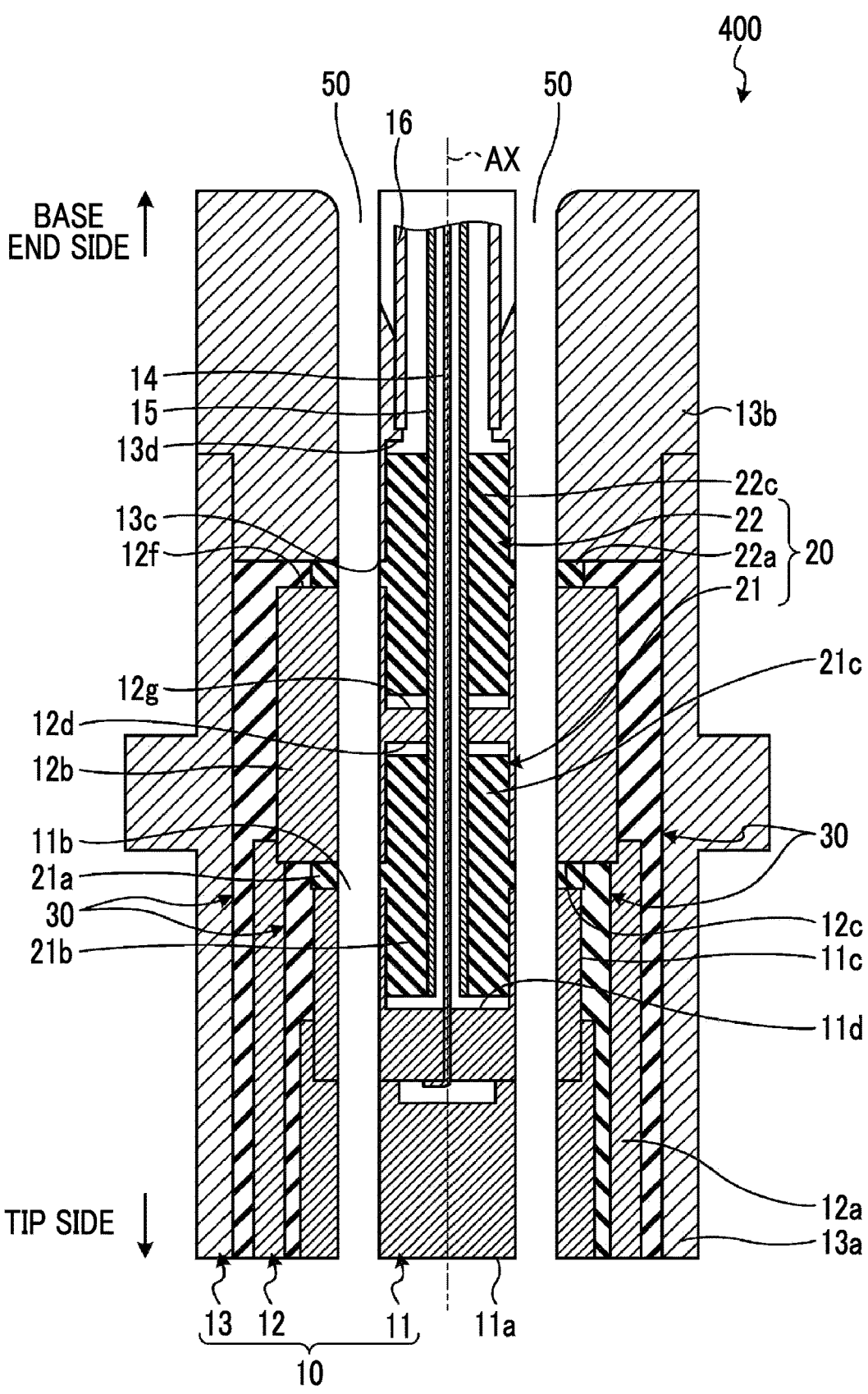
FIG. 6 is a view showing a configuration as seen in a cross section taken along line B-B in FIG. 5.

FIG. 4 is a view showing another example of the clearance sensor according to the present embodiment. FIG. 5 shows a configuration as seen in a cross section taken along line A-A in FIG. 4. FIG. 6 shows a configuration as seen in a cross section taken along line B-B in FIG. 5. A clearance sensor 400 shown in FIGS. 4 to 6 has a configuration in which a cooling flow path is provided. Other configurations are the same as the above-described configuration (configuration shown in FIG. 2). However, the present disclosure is not limited thereto, and the other configurations may be the same as the above-described configurations shown in FIG. 1.

As shown in FIGS. 5 and 6, cooling flow paths 50 penetrate the electrode members 10 and the insulation members 20 in the axial direction along the central axis AX. A plurality of the cooling flow paths 50 are disposed on a concentric circle centered on the central axis AX as seen in the axial direction along the central axis AX. Each cooling flow path 50 is formed to be linear along the axial direction along the central axis AX.

In an example shown in FIGS. 5 and 6, for example, the cooling flow paths 50 are positioned to penetrate the ground base portion 13*b* of the ground electrode 13, the base portion 22*a* of the second insulation member 22, the guard base portion 12*b* of the guard electrode 12, the base portion 21*a* of the first insulation member 21, and the detection electrode 11, and open at the detection end surface 11a at the first end of the detection electrode 11. As described above, the cooling flow paths 50 are provided at portions corresponding to the respective base portions of the electrode members 10 and the insulation members 20.

For example, cooling air or the like can be caused to flow through the cooling flow paths 50. For example, the cooling air can be caused to flow from the base end side to the tip side of the cooling flow paths 50. By means of cooling air or the like caused to flow through the cooling flow paths 50, it is possible to efficiently cool the portions corresponding to the respective base portions of the electrode members 10 and the insulation members 20. Accordingly, a temperature rise of the clearance sensor 400 can be suppressed.

Note that, in the example shown in FIGS. 4 to 6, a case where a configuration, in which the electrode members and the insulation members 20 are locked as shown in FIG. 1 or FIG. 2, is adopted has been described. However, the present disclosure is not limited thereto. For example, a configuration in which the electrode members 10 and the insulation members 20 are not formed and connection is achieved by means of, for example, fitting or the like may also be adopted.

Figure 7:
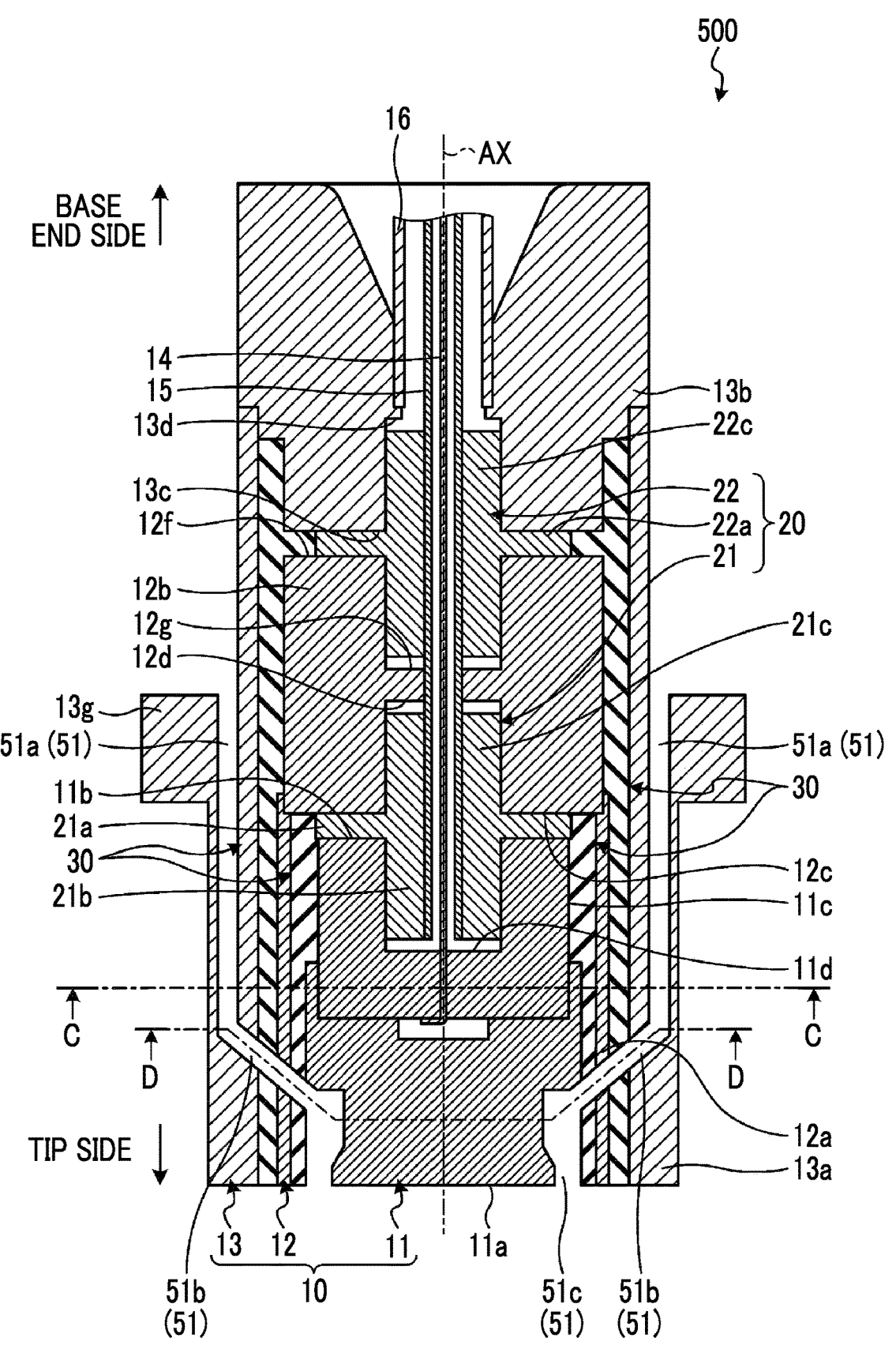
FIG. 7 is a view showing another example of the clearance sensor according to the present embodiment.
Figure 8:
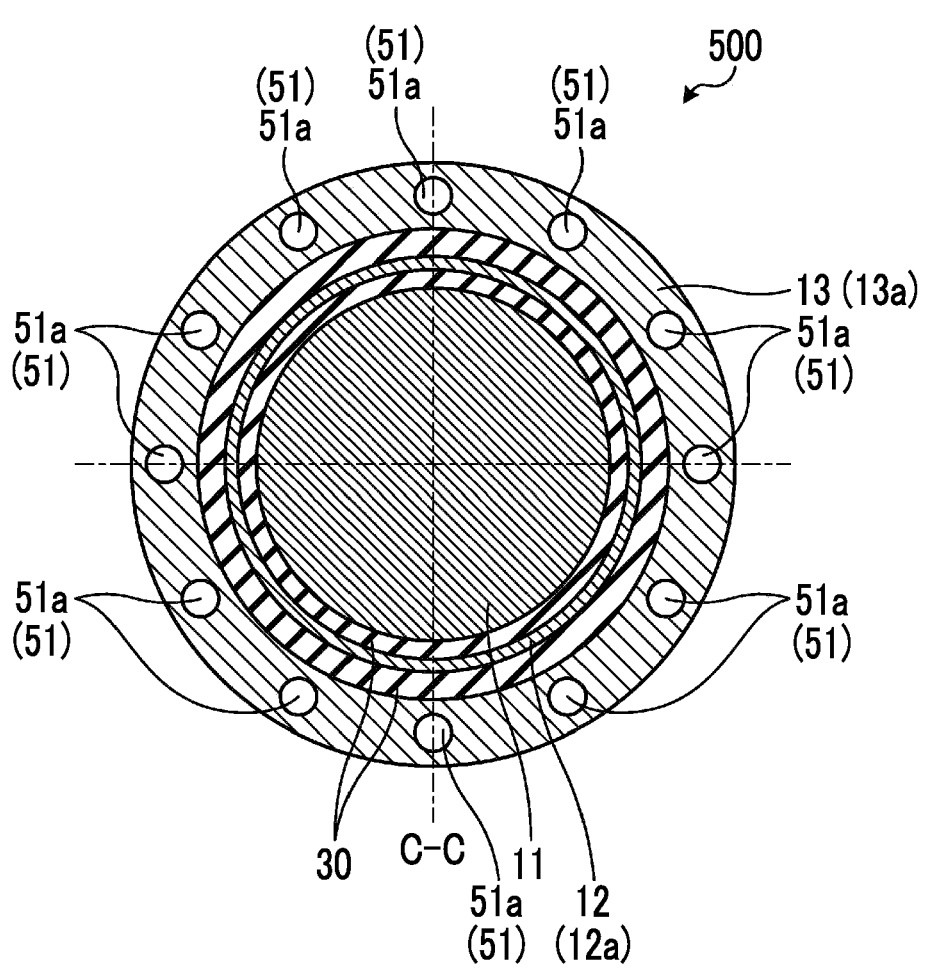
FIG. 8 is a view showing a configuration as seen in a cross section taken along line C-C in FIG. 7.
Figure 9:
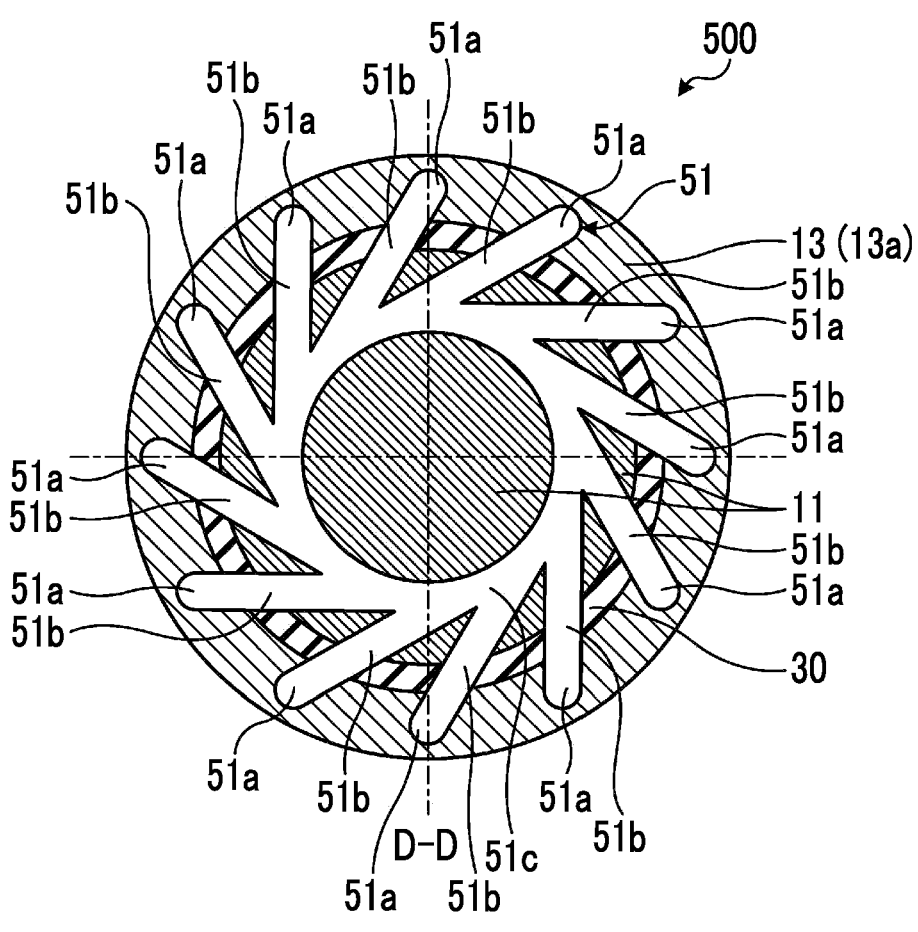
FIG. 9 is a view showing a configuration as seen in a cross section taken along line D-D in FIG. 7.

FIG. 7 is a view showing another example of the clearance sensor according to the present embodiment. FIG. 8 shows a configuration as seen in a cross section taken along line C-C in FIG. 7. FIG. 9 shows a configuration as seen in a cross section taken along line D-D in FIG. 7. A clearance sensor 500 shown in FIGS. 7 to 9 has a configuration in which cooling flow paths 51 different from the above-described cooling flow paths shown in FIGS. 4 to 6 are provided. Other configurations are the same as the above-described configuration (configuration shown in FIG. 2). However, the present disclosure is not limited thereto, and the other configurations may be the same as the above-described configurations shown in FIG. 1.

In an example shown in FIGS. 7 to 9, each of the cooling flow paths 51 includes a linear portion 51*a*, a convergence portion 51*b*, and an opening portion 51*c*. The linear portion 51*a* extends in the axial direction along the central axis AX inside, for example, the ground cylindrical portion 13*a* of the ground electrode 13. As shown in FIG. 7, a flange portion 13*g* is provided on the outer periphery of the ground cylindrical portion 13*a*. The diameter of a tip side of the flange portion 13*g* of the ground cylindrical portion 13*a* is larger than the diameter of a base end side of the flange portion 13*g*. The linear portion 51*a* extends in the axial direction along the central axis AX from a base end side end surface of the flange portion 13*g* to an inner portion of the ground cylindrical portion 13*a*. The linear portion 51*a* is connected to the convergence portion 51*b* at a tip side of the ground cylindrical portion 13*a*. As shown in FIG. 8, a plurality of the linear portions 51*a* are disposed along a circumferential direction of the ground cylindrical portion 13*a*. The plurality of linear portions 51*a* are disposed at the same pitch in the circumferential direction of the ground cylindrical portion 13*a*, for example.

The convergence portion 51*b* extends from the tip side of the ground cylindrical portion 13*a* toward a radial inner side. As shown in FIG. 7, the convergence portion 51*b* extends in a direction inclined toward the central axis AX over a range from a connection portion between the convergence portion 51*b* and the linear portion 51*a* to the tip side. In addition, as shown in FIG. 9, the convergence portion 51*b* extends in a direction tangent to the opening portion 51*c* from the connection portion between the convergence portion 51*b* and the linear portion 51*a*, as seen in the axial direction along the central axis AX. Since a configuration in which the convergence portion 51*b* extends in the direction tangent to the opening portion 51*c* from the as seen in the axial direction along the central axis AX is adopted, the length of the convergence portion 51*b* can be secured in comparison with a case where a configuration in which the convergence portion 51*b* extends toward the central axis is adopted. Therefore, the cooling efficiency related to a case where the cooling air is caused to flow is improved.

The opening portion 51*c* is disposed at a tip side end portion of the clearance sensor 500. The opening portion 51*c* is formed in an annular shape between the outer periphery of the detection electrode 11 and the guard cylindrical portion 12*a* of the guard electrode 12.

For example, cooling air or the like can be caused to flow through the cooling flow paths 51. For example, the cooling air flows toward the opening portions 51*c* via the convergence portions 51*b* from the linear portions 51*a* of the cooling flow paths 51 and is discharged to the outside through the opening portions 51*c*. By means of cooling air or the like caused to flow through the cooling flow paths 51, it is possible to efficiently cool the portions corresponding to the respective base portions of the electrode members 10 and the insulation members 20. Accordingly, a temperature rise of the clearance sensor 500 can be suppressed.

Note that, in the example shown in FIGS. 7 to 9, a case where a configuration, in which the electrode members and the insulation members 20 are locked as shown in FIG. 1 or FIG. 2, is adopted has been described. However, the present disclosure is not limited thereto. For example, a configuration in which the electrode members 10 and the insulation members 20 are not formed and connection is achieved by means of, for example, fitting or the like may also be adopted.

In addition, the clearance sensor may have, for example, configurations of both of the cooling flow paths of the clearance sensor 400 shown in FIGS. 4 to 6 and the cooling flow paths 51 of the clearance sensor 500 shown in FIGS. 7 to 9. Accordingly, cooling can be performed from an outer peripheral side to an inner side of the clearance sensor and thus the cooling efficiency is improved.

REFERENCE SIGNS LIST

10: Electrode member
11: Detection electrode
11*a*: Detection end surface
11*b*, 12*c*, 12*f*, 13*c*: End surface
11*c*: Outer peripheral surface
11*d*, 12*d*, 12*g*, 13*d*: Recess portion
11*e*, 12*e*, 12*h*, 13*e*, 21*d*, 21*e*, 22*d*, 22*e*: Screw thread
11*f*, 12*i*, 13*f*: Diameter reduction portion
12: Guard electrode
12*a*: Guard cylindrical portion
12*b*: Guard base portion
13: Ground electrode
13*a*: Ground cylindrical portion
13*b*: Ground base portion
13*g*: Flange portion
14: Wire portion
15: Tubular member
16: Tubular component
20: Insulation member
21: First insulation member
21*a*, 21*b*: Base portion
21*b*, 21*c*, 22*b*, 22*c*: Protrusion portion
22: Second insulation member
30: Insulation layer
31, 32: Spacer member
41, 42, 43, 44: Pin
50, 51: Cooling flow path
51*a*: Linear portion
51*b*: Convergence portion
51*c*: Opening portion
100, 200, 300, 400, 500: Clearance sensor
AX: Central axis

The invention claimed is:

1. A clearance sensor comprising:
an electrode member including a columnar detection electrode including a detection end surface on a first end side with respect to an axial direction along a central axis of the detection electrode, the electrode member further including a guard electrode and a ground electrode having central axes coaxial with the central axis of the detection electrode;
an insulation member connecting the detection electrode and the guard electrode to each other, and connecting the guard electrode and the ground electrode to each other;
an insulation layer filling a gap between the detection electrode, the guard electrode, the ground electrode, and the insulation member; and
a cooling flow path penetrating the electrode member and the insulation member in the axial direction along the central axis of the detection electrode,
wherein the electrode member and the insulation member are locked to each other in at least one of the axial direction along the central axis and a direction around the central axis, and
wherein the cooling flow path opens at the detection end surface on the first end side of the detection electrode with respect to the axial direction along the central axis of the detection electrode.

2. The clearance sensor according to claim 1,
wherein the guard electrode includes a guard cylindrical portion surrounding an outer peripheral surface of the detection electrode and a guard base portion disposed on a second end side of the detection electrode opposite to the first end side in the axial direction with respect to the detection electrode, and the guard base portion being connected to the guard cylindrical portion,
wherein the ground electrode includes a ground cylindrical portion surrounding an outer peripheral surface of the guard electrode and a ground base portion disposed on the second end side of the detection electrode in the axial direction with respect to the guard electrode, and the ground base portion connected to the ground cylindrical portion, and
wherein the insulation member includes a first insulation member connecting the detection electrode and the guard base portion to each other in the axial direction and a second insulation member connecting the guard base portion and the ground base portion to each other in the axial direction.

3. The clearance sensor according to claim 1, wherein the electrode member and the insulation member are locked to each other by being screw-bonded to each other.

4. The clearance sensor according to claim 1, wherein the electrode member and the insulation member are locked to each other by a pin.

5. The clearance sensor according to claim 1, wherein further comprising a spacer member formed of an insulator disposed in at least one of (i) a gap between the detection electrode and the guard electrode, and (ii) a gap between the guard electrode and the ground electrode.

6. The clearance sensor according to claim 1, wherein the cooling flow path is one of a plurality of cooling flow paths disposed on a concentric circle centered on the central axis of the detection electrode as seen in the axial direction along the central axis.

7. The clearance sensor according to claim 6, wherein each of the plurality of cooling flow paths is linear along the axial direction along the central axis.

8. The clearance sensor according to claim 6, wherein the plurality of cooling flow paths are formed to gather from an outer side to an inner side in a radial direction with respect to the central axis toward a detection end side.

9. A clearance sensor comprising:

an electrode member including a columnar detection electrode including a detection end surface on a first end side with respect to an axial direction along a central axis of the detection electrode, the electrode member further including a guard electrode and a ground electrode having central axes coaxial with the central axis of the detection electrode;

an insulation member connecting the detection electrode and the guard electrode to each other, and connecting the guard electrode and the ground electrode to each other;

an insulation layer filling a gap between the detection electrode, the guard electrode, the ground electrode, and the insulation member; and a cooling flow path penetrating the electrode member and the insulation member in the axial direction along the central axis of the detection electrode, the cooling flow path opening at the detection end surface on the first end side of the detection electrode with respect to the axial direction along the central axis of the detection electrode.

10. The clearance sensor according to claim 9, wherein the cooling flow path is one of a plurality of cooling flow paths disposed on a concentric circle centered on the central axis of the detection electrode as seen in the axial direction along the central axis.

11. The clearance sensor according to claim 10, wherein each of the plurality of cooling flow paths is linear along the axial direction along the central axis.

12. The clearance sensor according to claim 10, wherein the plurality of cooling flow paths are formed to gather from an outer side to an inner side in a radial direction with respect to the central axis toward a detection end side.

* * * * *